April 3, 1962      G. F. FARMER      3,027,727
REFRIGERATING APPARATUS EMPLOYING FUEL AS A REFRIGERANT
Filed Jan. 19, 1959
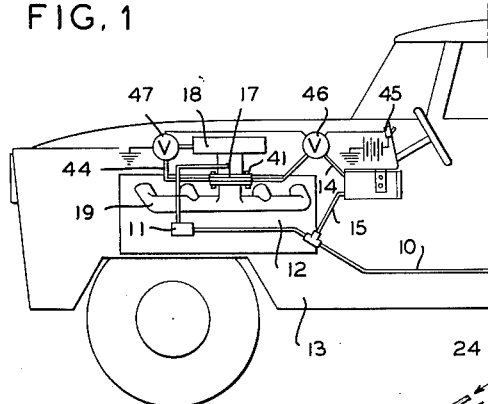
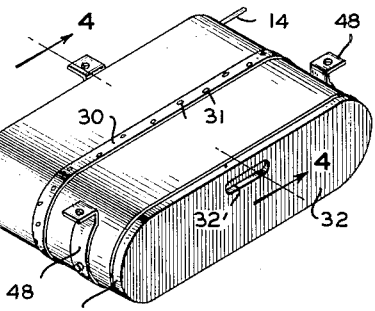
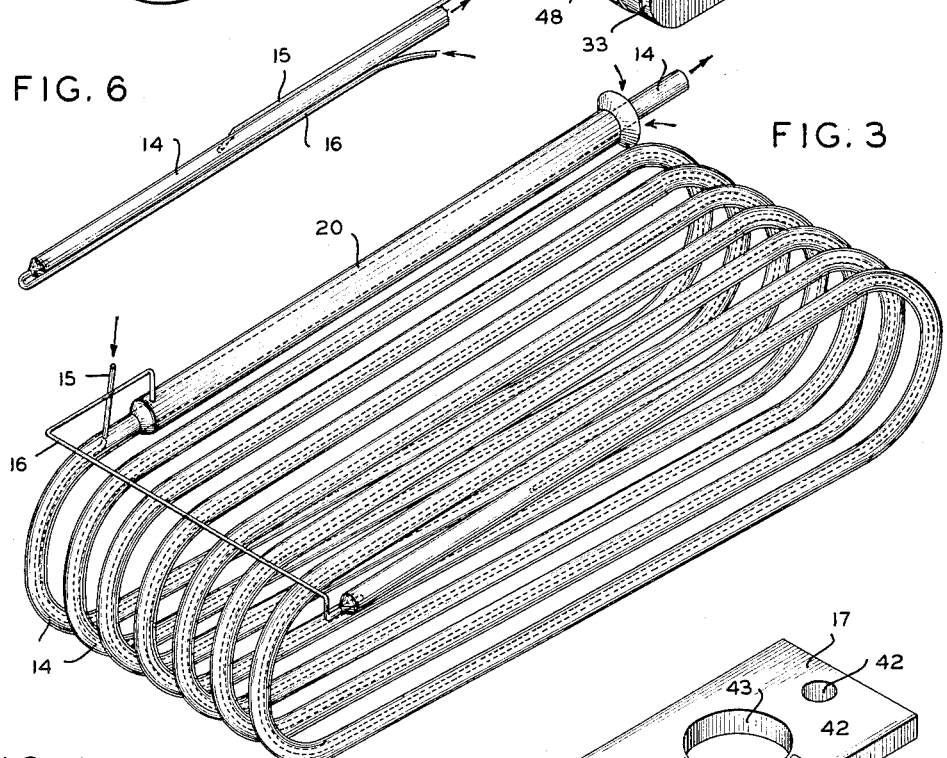
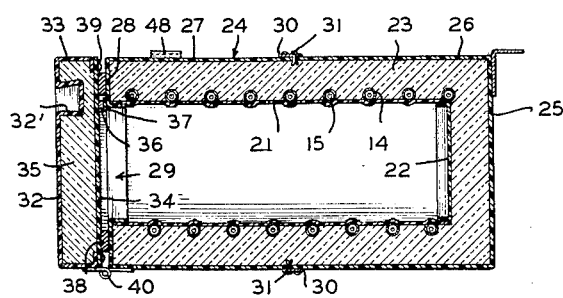
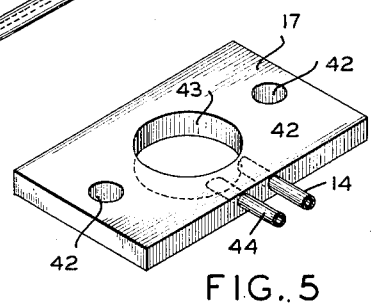
INVENTOR
GUY F. FARMER United States Patent Office 3,027,727
Patented Apr. 3, 1962

3,027,727
REFRIGERATING APPARATUS EMPLOYING
FUEL AS A REFRIGERANT
Guy F. Farmer, Morgan City, La., assignor to Pol-Air Incorporated, Morgan City, La.
Filed Jan. 19, 1959, Ser. No. 787,532
3 Claims. (Cl. 62—7)

This invention relates to the preservation of matter including that consumed by humans and to other substances, and requiring refrigeration or a temperature below that of the atmosphere, in order to maintain such matter in the desired condition, or state of preservation.

The invention also relates to apparatus or equipment for providing the necessary temperature reduction and including in connection with automobiles and other vehicles or structures in which a volatile fluid is utilized for the propulsion or operation thereof or in connection therewith, and which fluid is capable of changing its state from liquid to a vapor in which process heat is absorbed or removed from its surrounding environment.

Refrigerators have been produced for various purposes including for automobiles and other units, mobile or otherwise, however, they have been expensive to produce, install and operate, and they have been complicated, inefficient, expensive and of limited use and availability.

It is an object of the invention to provide a refrigerator of small compact size and a minimum number of parts of readily available materials which can be easily produced and installed, and which utilizes a volatile fluid as the refrigerant prior to the subsequent use of the same in connection with an automobile or other structure in connection with which such fuel is utilized.

Another object of the invention is to provide a small refrigerator of the character described without moving parts and capable of being produced with a minimum of equipment at minimum cost, and which can be installed beneath the dash, in the trunk, or other desired or convenient location in an automobile or other structure.

Another object of the invention is to provide a small refrigerator having an inner shell or liner, a housing or outer shell, and a refrigerating coil about and in intimate heat exchange with the inner shell or liner which is properly insulated from the atmosphere against heat transfer, and with a liquid supply line to the refrigerating coil and a suction or vapor return line, and with brackets for supporting the unit in a desired location.

A further object of the invention is to provide a small refrigerator of the character indicated, in which both the housing or outer shell or jacket and the liner or inner shell are composed of inexpensive materials capable of being readily fabricated of a minimum number of parts and with the housing or jacket of non heat conductive material and of relatively smooth external configuration without corners or projections likely to engage or snag clothing.

Other objects and advantages of the invention will be apparent from the following description taken in conjunction with the accompanying drawings wherein:

FIG. 1 is a schematic view illustrating one application of the invention;
FIG. 2, a perspective of a unit ready for mounting;
FIG. 3, an enlarged perspective of the coil itself;
FIG. 4, a section on the line 4—4 of FIG. 2;
FIG. 5, a perspective of a carburetor fitting; and
FIG. 6, an enlarged fragmentary detail of a modified type of coil.

Briefly stated, the invention is a refrigeration system and process which involves the use of a relatively volatile fluid such as gasoline and the withdrawal of the same from the fuel system of an internal combustion engine, the utilizing of such fluid as the refrigerant in the system, and the return of the mixture of fluid and air to the fuel system. Fuel is drawn by means of the suction of the internal combustion engine into and through a refrigeration coil. This coil includes a tube within or in heat exchange relation with a larger tube, the smaller tube serving for the admission of the fuel which constitutes the refrigerating fluid and the larger tube forming the suction line to the internal combustion engine. The smaller tube or fuel line extends lengthwise through the larger tube to a point near the remote end of the latter after passing through the length thereof and discharges into the remote end portion of the outer tube and air is introduced therein for mixing with the refrigerant to provide a vaporizable combustible mixture and the amount of air is supplied by means of a line of pre-determined length. The fuel is discharged into the larger tube and this discharge into the larger tube results in expansion and vaporization and this change in physical state from a liquid to a gas, absorbs heat and cools the larger or outer of the coils. The refrigerating coil is disposed within a housing or shell about an inner shell or liner defining the area to be refrigerated removing heat from such area.

With continued reference to the drawing, the refrigeration system of the present invention includes utilizing a volatile hydrocarbon or other fuel such as gasoline from a fuel line 10 extending to a fuel pump 11 of an internal combustion engine 12 of an automobile 13.

Fuel is diverted from the fuel line 10 into a cooling coil composed of an extent or length of large and small tubing 14 and 15 respectively in heat exchange relation for a substantial portion of their lengths, either with one within the other as illustrated in FIG. 3 or beside the other in good heat conductive or exchange relation as illustrated in FIG. 6 and with the smaller or capillary tube 15 discharging into the remote end of the large tube 14 which constitutes the evaporative or suction line and with air introduced through a tube 16 into the larger or suction coil at such remote end location to mix with the fuel and provide a combustible mixture for combustion within the internal combustion engine 12 to which the suction line is connected, a fitting 17 being applicable between the carburetor 18 and the intake manifold 19 for such purpose.

The capillary line 15 through which fuel is admitted into the larger or suction line 14 terminates in spaced relation, 4½ inches having been found satisfactory, to the outermost end of the suction line, which forms in effect a mixing chamber, air being introduced through the tube 16 into the end of the suction line so that mixing of fuel and air from opposite directions is accomplished in the latter.

The air line may be in heat exchange relation with the suction line so that the air may be cooled slightly before it is injected into the mixing chamber. This heat exchange may be accomplished by having an enlarged tube 20 disposed about a portion of the suction line or it may be merely in heat exchange relation therewith.

Liquid fuel moves through the capillary tube throughout substantially the length of the suction line in counterflow direction and discharges into the mixing chamber in the remote end thereof where it comes into counter-movement contact with air with which it mixes. The counterflow of liquid and vapor and the movement thereof produces reduction in temperature. When the liquid and suction lines are concentric and the flow extends horizontally and vertically greater action of the refrigerant will be obtained.

The cooling coil composed of the tubes 14 and 15 is disposed about a shell or liner 21 in good heat conductive relation in order to cool the interior of the shell or liner and anything contained therein. Both the cooling coil and the shell or liner are generally oval-shaped so that the only unrefrigerated portions are the front and rear of the shell or liner, the rear being an integral bottom 22, it being apparent that the shell or liner may be two pieces permanently joined as indicated or of one-piece construction.

About the oval shell or liner with its intimate external coil is disposed insulation 23 of any desired character with a jacket or housing 24 retaining the insulation and providing a finish to the device.

The jacket or housing 24 is composed of a molded oval container of non-heat conductive material consisting of a bottom 25 and a continuous side wall 26 joined to a side wall 27, having an inwardly and reversely extending flange 28 defining a door opening 29. The sections 26 and 27 are abutted, and the abutting edges are covered by a strip 30, and are fastened in place in any desired manner, as for example, by blind rivets 31.

The door opening 29 is closed by a molded door also of non-heat conductive material formed of an outer shell 32 with an inset hand grip 32' and having a peripheral flange 33 and a closure member 34 retaining insulation 35. The door is retained in closed position by a magnet 36 and metal bar with an interposed door gasket 38. The closure member 34 is secured in place by fasteners 39 engaging extended portion of the flange of the shell. The door is attached to the front of the cabinet by means of spaced hinges 40.

The fitting 17 is adapted to be placed between the carburetor and its support and is secured in place by bolts 41 extending through openings 42 in the block, such adapter block having a central opening 43 through which the combustible mixture of fuel and air can pass to the intake manifold of the automobile. The suction line 14 has communication with said passage 43, as also does an air line 44 from the air strainer of the automobile. The suction line 14 is controlled by a switch 45 which controls electrically operated valves 46 and 47 in the lines 14 and 44.

The two part jacket or housing is devoid of external projections or the like which might be engaged by and damage clothing, such housing being rounded at the corners. Suitable suspension brackets 48 are provided for the suspension of the device beneath the dash or instrument panel.

It has been found that a coil approximately 15 feet in length, .017" wall thickness, and ⅜" outside diameter provides a satisfactory evaporation or suction line with a slightly shorter and smaller fuel line in the nature of a capillary tube disposed within or along and in heat exchange relation with the suction line, and an air tube also in heat exchange with the suction line, the construction described giving a temperature of —20° F.

In the operation of the device gasoline is taken through the line 15 from the fuel line 10 (FIG. 1). This line (FIG. 3) extends into the first convolution of the coil 14 and interiorly of such coil to a point near the end where it unites with air admitted around the coil 14 within the sleeve 20 and then through the tube 16 into the opposite extremity of the coil 14 and upon uniting with the gasoline at that point the mixture is sucked in reverse direction through the coil 14 around the tube 15 until it reaches the valve 46 from which it passes to the fitting 17 located beneath the control valve of the carburetor. In view of the fact that the control valve of the carburetor is designed to discharge a mixture of a particular ratio of air and gas, the supplying of additional gas through the tube 14 requires the addition of air in order that the mixture will not be changed and consequently the air line 44 is provided and a valve 47 is interposed in such line. When the refrigerator is not operating, the valves 46 and 47 will be closed interrupting flow through the tubes 14 and 44.

It will be apparent from the foregoing that a single miniature refrigerator is provided at a minimum of cost and in which liquid from the fuel or high pressure side of the system moves in opposition to suction in the low side of the system producing an exchange of heat between the suction gas and the incoming fuel, thus reducing the temperature of the fuel and consequently the heat to be removed, the fuel being supplemented by injected air providing a combustible mixture and the cooling effect produced by the evaporation or vaporization of the liquid fuel along the length of a serpentine coil cools the shell or liner of the miniature refrigerator. Such shell is of integral construction and enclosed by insulation and an outer jacket or shell of plastic or the like on the rear and front of two-piece construction with a pivoted door at the front of the same, and that the device can be readily installed in any desired location in an automobile or the like.

It will be obvious to those skilled in the art that various changes may be made in the invention without departing from the spirit and scope thereof and therefore the invention is not limited by that which is illustrated in the drawing and described in the specification, but only as indicated in the accompanying claims.

What is claimed is:

1. Refrigeration apparatus for use with a device employing volatile fluid comprising a shell structure defining a chamber to be refrigerated, a cooling coil in intimate heat conductive relation with said shell structure and constructed for attachment of suction producing means to one end of said coil, a second coil in heat exchange relation lengthwise of the first and having one end for connection to a source of fuel and its opposite end terminating in spaced relation within the remote end of the first coil for counter-flow, an air inlet into the remote end of the first coil for supplying air counter to the admission of fuel and for mixing with the latter for vaporization and combustion, a tube for supplying air to said air inlet in heat exchange relation with said first tube whereby the fuel and the air will be precooled before being discharged into the remote end of the first tube where mixing occurs.

2. A refrigeration system of fixed parts for use with an automobile and using the fuel thereof in the refrigerating process comprising a cooling coil having a series of convolutions, said coil being flattened and defining a refrigerating area, means for attaching one end of said coil to the suction of the automobile, a capillary tube for attachment to the fuel system of the automobile for diverting fuel into the other and remote end of said coil, said capillary tube being disposed lengthwise within said coil for heat exchange relation with suction gas drawn therearound and in counter-flow relation, a capillary air inlet tube connected to the remote end of said coil for supplying air thereinto counter to the inlet of fuel for mixing with such fuel for vaporization suitable for combustion, said capillary tube for supplying air having a larger concentric pipe about a portion of a length of said coil for precooling the air supply.

3. A refrigeration system of fixed parts for use with an automobile and using the fuel thereof in the refrigerating process comprising a cooling coil defining a refrigerating area, means for attaching one end of said coil to the suction of the automobile, a fuel supply tube for attachment to the fuel system of the automobile for diverting fuel into the other and remote end of said coil, said fuel supply tube being disposed lengthwise within said coil for heat exchange relation with suction gas drawn therearound and in counter-flow relation, an air inlet tube connected to the remote end of said coil for supplying air thereinto counter to the inlet of fuel for mixing with such fuel for vaporization suitable for combustion, said fuel supply tube for supplying air having a larger concentric pipe about a portion of a length of said coil for precooling the air supply.

References Cited in the file of this patent

UNITED STATES PATENTS

| | | |
|---|---|---|
| 2,438,594 | Zapart | Mar. 30, 1948 |
| 2,872,790 | Simpson | Feb. 10, 1959 |